United States Patent [19]

Montierth

[11] 4,428,758

[45] Jan. 31, 1984

[54] SOLID PARTICULATE FILTERS

[75] Inventor: Max R. Montierth, Elmira, N.Y.

[73] Assignee: Corning Glass Works, Corning, N.Y.

[21] Appl. No.: 350,996

[22] Filed: Feb. 22, 1982

[51] Int. Cl.³ .............................................. B01D 39/20
[52] U.S. Cl. ............................... 55/523; 55/DIG. 30;
55/DIG. 5; 210/510.1; 422/180; 264/60;
264/264
[58] Field of Search ........... 55/484, 502, 523, DIG. 5,
55/ DIG. 30; 210/510; 422/191, 180;
428/116–118; 60/295, 299, 311; 29/163.5 F;
165/8; 501/112, 119, 80; 252/477 R

[56] References Cited

U.S. PATENT DOCUMENTS

| 4,276,071 | 6/1981 | Outland | 55/523 |
| 4,329,162 | 5/1982 | Pitcher, Jr. | 55/523 |

FOREIGN PATENT DOCUMENTS

| 2071639 | 9/1981 | United Kingdom | 428/116 |
| 2071640 | 9/1981 | United Kingdom | 428/116 |

Primary Examiner—David L. Lacey
Attorney, Agent, or Firm—R. N. Wardell

[57] ABSTRACT

The invention comprises solid particulate filter bodies having so-called "sloppy" plugging configurations in which clusters of mutually adjoining cell ends are plugged at the two end faces of a honeycomb structure such that the clusters at each end face adjoin or partially overlap one another and at least some of the cells of the structure are closed at both end faces while the remaining cells of the structure are closed at only one end face. Preferably "sloppy" plugging is accomplished by providing a pair of masks each having a plurality of opening extending therethrough which are sufficiently large to expose clusters of mutually adjoining cell ends and are positioned so as to partially overlap one another when the two masks are aligned opposing one another on opposite end faces of a honeycomb structure. A flowable plugging material charged through the masks plugs the clusters of cell ends at each end face. By simultaneously providing such a pair of masks in alignment opposing one another and against opposing end faces of a honeycomb structure there is no need to achieve exact lateral alignment between the mask openings and the cell ends. Mere positioning of the structure within the area where the mask openings overlap is sufficient. The masks may be fitted to separate feed heads of a cement press or temporarily clamped against the end faces of a honeycomb structure using a suitable frame and the structure charged through the masks by any suitable means. An alternative embodiment employing a single mask for consecutively plugging opposing end faces is also described.

8 Claims, 13 Drawing Figures

SOLID PARTICULATE FILTERS

BACKGROUND OF THE INVENTION

The invention relates to filter bodies for entrapping solic particulates and larger contaminants present in fluids and, in particular, to filters of new configurations and methods for forming such filters from thin porous walled, honeycomb structures.

The removal of solid particulates from fluids, gases or liquids, in which the particulates are mixed or suspended is typically accomplished by means of filters made from solid materials which are formed into articles or masses having a plurality of pores of small cross-sectional size extending therethrough, which may be interconnected, such that the solid materials are both permeable to the fluids which flow through the article or mass and capable of restraining some or all or substantially all of the particulates mixed in the fluid from passing through the article or mass, as desired. Such pores constitute what is termed "open porosity" or "accessible porosity". Particulates are collected on the inlet surface(s) and/or within the pores of the material. The minimum cross-sectional size of some or all of the pores can be larger than the size of some or all of the particulates to be removed from the fluid, but only to the extent that significant or desired amounts of sufficiently large particulates become trapped on or within the filters during the transit of contaminated fluid. As the mass of collected particulates increases, the flow rate of the fluid through the filter generally decreases to an undesirable level. The filter is then either discarded as a disposable, replaceable element or regenerated by removing the collected particulates. Desirable features of the filter include compact structure, mechanical integrity, durability, inertness or non-deleterious reaction with the fluid and/or particulate material.

For some time solid particulate filter bodies have been formed from honeycomb structures. Ser. No. 165,646, filed July 3, 1980 and assigned to the assignee hereof, and U.S. Pat. Nos. 4,276,071, both incorporated by reference herein, describe essentially unidirectional flow solid particulate filters formed from honeycomb structures each having a matrix of thin, porous, intersecting walls defining a pair of open, end faces on opposing outer surfaces of the structure and a multiplicity of cells extending longitudinally through the structure in a substantially mutually parallel fashion between the end faces. At each end face where the open transverse areas of the cells would normally be exposed, the ends of alternate cells are closed in a checkered or checkerboard pattern. The pattern of alternate closed cell ends is reversed at either end face so that each cell of the structure is closed at only one end face and shares thin walls in common with adjoining cells which are closed only at the opposing end face of the structure. A contaminated fluid introduced under pressure to an "inlet" end face of the filter body passes into those cells open at the inlet end face ("inlet" cells). Because the inlet cells are closed at the opposing "outlet" end face of the structure, the contaminated fluid is forced to pass across the narrow dimension of the thin, porous walls into the adjoining "outlet" cells (which are all closed at the inlet end face and open at the outlet end face of the structure) and through the outlet cells to and through the outlet end face of the filter. The solid particulate matter in the fluid, or that portion which is sufficiently large, is eposited on the thin wall surfaces defining the interior of the inlet cells or is trapped in the pores forming the interconnected open porosity of the thin walls. All of the contaminated fluid passing through the structure is filtered and all of the interconnected, thin walls of the structure, each of which is shared in common between an adjoining inlet and outlet cell, are utilized in filtering.

Various methods and/or apparatus have been devised to close the ends of selected cells at each open end face of a honeycomb structure by plugging and, in some cases, by covering cell ends. The application Ser. No. 165,646 describes plugging selected cell ends at each end face of a honeycomb structure using an air actuated cement charging gun, the nozzle of which must be aligned with each cell end to be closed. Other methods and apparatus are described and claimed in the following pending application Ser. Nos. 283,732, 283,733 283,734 and 283,735 filed July 15, 1981, and 295,610 and 295,611, both filed Aug. 24, 1981, all assigned to the assignee hereof and incorporated by reference herein. In application Ser. No. 295,611, all cell ends at an end face of the honeycomb structure were temporarily plugged and plugs in selected cells were moved through or removed from the structure by apparatus aligned with the selected cell ends. In application Ser. No. 283,732, a solid covering was applied to the open end face of a honeycomb structure and openings made through the covering by a tool aligned with selected cell ends sensed beneath the covering. Application Ser. No. 283,733 describes plugging honeycomb structures to form solid particulate filter bodies using a mask comprising a solid covering having a plurality of openings extending through it each of which has to be formed or aligned opposite a cell end selected to be plugged. Plugging material was passed through the mask openings and into the selected cell ends completing their closure. Application Ser. No. 295,610 describes two improved mask embodiments in which protrusions or plugs forming a portion of the mask had to be aligned with and inserted into selected cell ends. Application Ser. No. 283,734 describes flexible and elastic masks having openings extending therethrough and protrusions extending therefrom, the latter being inserted into and temporarily sealing cell ends not to be plugged and serving to align the mask openings with other cell ends selected for plugging.

One problem associated with each of these inventions is that like the air gun method of the application Ser. No. 165,646, each requires that a tool be aligned with or, in the case of a mask, openings formed or aligned opposite and/or, in certain cases, protrusions aligned with and inserted into the ends of each of a multiplicity of selected cells. The described honeycomb filters are often densely celled and may have transverse, cross-sectional cellular densities ranging upwards to about 100 cells/cm$^2$ or more. Tolerances required both in the fabrication of masks and other tools and in the alignment of the masks or tools with each of a large number of selected cell ends at the end face are narrow, adding to filter manufacturing difficulties and expense. Moreover, due to manufacturing limitations, honeycomb structures typically cannot be fabricated with their cells in perfect alignment. Thus, where a honeycomb structure is formed with a multiplicity of cells having substantially square, transverse cross-sectional geometries and arranged in mutually parallel rows and columns, one cannot expect the thin walls forming the rows and columns of the adjoining cells to be perfectly straight as is desired. This lack of cellular uniformity limits the usefulness of or at least increases the difficulties involved in using the described masks and tools, many of which are essentially inflexible and cannot be adjusted to compensate for these imperfections. This condition further complicates and thus makes more exensive any automation of any of these described filter fabricating processes.

Another problem associated with many of these filter fabricating inventions is that the tool(s) or mask(s) typically can be aligned as easily with either of the two sets of alternate cells selected to be closed at each end face of the honeycomb structure. Both the applications Ser. No. 283,732 and 295,611 describe embodiments which can or must select mutually exclusive sets of cells for plugging at either end face of a honeycomb structure. The aforesaid application Ser. No. 283,735 describes methods and apparatus for achieving closure of mutually exclusive sets of cells at either end face of a honeycomb structure using particular embodiments of the flexible/elastic masks described and claimed in the aforesaid application Ser. No. 283,734. The remaining filter fabricating methods and apparatus referred to above require that registration of a tool or mask with mutually exclusive sets of cells ends be verified, typically by a worker installing or using the mask or tool, thus adding to filter manufacturing expense.

More recently, other solid particulate filter body configurations have been identified which have simplified, to some extent, filter fabricating processes. Another copending application Ser. No. 350,998, filed on Feb. 22, 1982 assigned to the assignee hereof and incorporated by reference, describes and claims solid particulate filters fabricated from matrices of interconnected thin walls having at least a sufficient amount of interconnected open porosity to allow fluid to flow through the greater as well as across the narrower dimensions of the thin walls, thereby obtaining filtration through all thin wall surfaces defining each inlet cell irrespective of the type of adjoining cell (i.e. inlet or outlet) with which the inlet cell shares its defining thin walls in common. This feature simplifies to some extent the filter fabrication process as it allows cells to be closed in rows, columns or other clusters, and thus reduces the necessity to deal with each cell of the structure separately. Yet another related copending application Ser. No. 350,995 also filed on Feb. 22, 1982, assigned to the assignee hereof and incorporated by reference, depicts and decribes other filter configurations provided with this increased thin wall porosity and having cells closed in clusters. None of the filter embodiments described in either of these applications, however, eliminates the necessity of aligning a mask or tool with the clusters of selected cell ends at either end face of the honeycomb structure or of verifying that the mask or tool has been aligned with mutually exclusive sets of cells at either end face of the structure.

OBJECTS OF THE INVENTION

It is an object of the invention to provide new solid particulate filter body configurations.

A further object of the invention is to provide new methods for fabricating filter bodies having new configurations.

Another object of the invention is to provide apparatus for fabricating filter bodies having new configurations.

Another object of the invention is to provide solid particulate filter body fabricating methods and apparatus employing masks in which alignment of the masks with either end face of a honeycomb structure is accomplished using the sidewalls of the structure.

Another object of the invention is to provide solid particulate filter body fabricating methods and apparatus employing masks which do not require alignment of the masks with individual cells of the honeycomb structure used to form the filter body.

Another object of the invention is to provide solid particulate filter body fabricating methods and apparatus which are essentially insensitve to lateral distortions in the cellular matrix of the honeycomb structures.

Other objects of the invention are to provide methods and apparatus whereby solid particulate filter bodies may be fabricated from honeycomb structures more simply, quickly and inexpensively than has heretofore been possible.

Other objects and aspects of the invention will appear to those skilled in the art.

SUMMARY OF THE INVENTION

The above objects are satisfied by the present invention which comprises new solid particulate filter body configurations and methods and apparatus for fabricating the same from honeycomb structures.

One aspect of the invention is methods for fabricating solid particulate filter bodies. Generally according to this aspect of the invention, a filter body is formed by the following steps: providing a honeycomb structure formed by a matrix of thin, interconnected, porous walls defining a pair of open end faces on opposing sides of the structure and a multiplicity of hollow cells open at and extending through the structure between the pair of opposing open end faces; the thin walls having internal interconnected open porosity of a volume and size sufficient to enable the fluid to flow across the narrow dimension (i.e. thickness) of the thin wall and to prevent at least a significant portion of the solid particulates from flowing in any direction entirely through the thin walls; closing at one open end face a first set of open cell ends arranged in clusters of mutually adjoining first set cells, the clusters being separated from one another by the remaining cells of the multiplicity and closing at the remaining open end face a second set of open cell ends also arranged in clusters, at least one of the clusters of cell ends of the second set at least partially overlapping at least one of the clusters of cell ends of the first set whereby all cells of the multiplicity are closed at at least one end face and at least some of the cells of the multiplicity, "buffer" cells, are closed at the two end faces of the structure. Typically, several of the clusters of cell ends closed at the remaining end face at least partially overlap clusters of cell ends closed at the one end face forming a plurality of sets of mutually adjoining buffer cells.

According to an important feature of the invention, the open ends of subsets of cells are closed at each open end face by covering the open face with a mask having a plurality of openings extending therethrough and charging a flowable sealing material against the mask and through the openings into open cell ends opposite the openings.

A second important aspect of the invention is envisioned apparatus for fabricating solid particulate filter bodies from honeycomb structures having a multiplicity of cells extending between opposing open end faces using the above-described inventive methods. Each apparatus comprises a mask or pair of masks having openings sufficiently large and suitably positioned with respect to one another as to be able to be used to close clusters of cells at each end face of a honeycomb structure, and positioned at least one cluster on one end face partially overlapping at least one cluster at the opposing end face of the structure, whereby all cells are closed at at least one end face and at least some are closed at the two end faces.

An important feature of this aspect of the invention is that individual cell ends do not have to be aligned with mask openings and thus in each envisioned embodiment, the end face of the honeycomb structure may be positioned laterally with respect to the outer surface of the mask for charging by means of contacting the side wall of the honeycomb structure.

An envisioned preferred apparatus comprises a press having a pair of opposing feed heads, each having an orifice through which a plugging material is charged and fitted across each orifice a mask having a plurality of openings extending therethrough the masks being fabricated and positioned in the press such that the openings through one mask at least partially overlap the openings through the remaining mask when each of the masks is positioned against an opposing open end face of a honeycomb structure placed in the press between the masks for plugging. The ends of cells of a honeycomb structure positioned between the feed heads and masks are charged with a plugging material in at least partially overlapping patterns at each end face such that all of the cells have at least one end plugged at one end face and some of the cells (i.e. at least some of those cells within the overlap of the mask openings) have ends plugged at the two end faces. Alternatively, a pair of suitable masks can be mounted on an adjustable frame and positioned against opposing end faces of a honeycomb structure placed therebetween for charging the open cell ends by means other than a double feed headed press. Lastly a single suitably designed mask can be used to plug overlapping subsets of cells at either opposing end face of a honeycomb structure in sequence.

The third aspect of the invention is new solid particulate filter body configurations which can be fabricated using the inventive methods and apparatus. Each filter body coamprises a honeycomb structure having a matrix of thin interconnected porous walls defining a pair of opposing open end faces, which become the inlet and outlet end faces of the filter, and a multiplicity of hollow cells open at and extending through the structure between the pair of end faces. Clusters of cell ends are closed at either end face in an overlapping fashion so as to form first subsets of mutually adjoining cells closed at one end face, second subsets of other mutually adjoining cells closed at the remaining end face, and at least one subset of mutually adjoining cells closed at the two end faces and positioned between and adjoining a subset of the first set and a subset of the second set.

BRIEF DESCRIPTION OF THE DRAWINGS

The various aspects of the invention will be better understood with reference to the accompanying drawings in which:

FIG. 3 is an oblique diagrammatic view of a filter body fabricated using the apparatus of FIGS. 1, 2, and 2a;

FIG. 5 is an oblique diagrammatic view of the honeycomb structure fabricated using the apparatus of FIGS. 1, 4 and 4a;

DETAILED DESCRIPTION OF THE INVENTION

Figure 1:
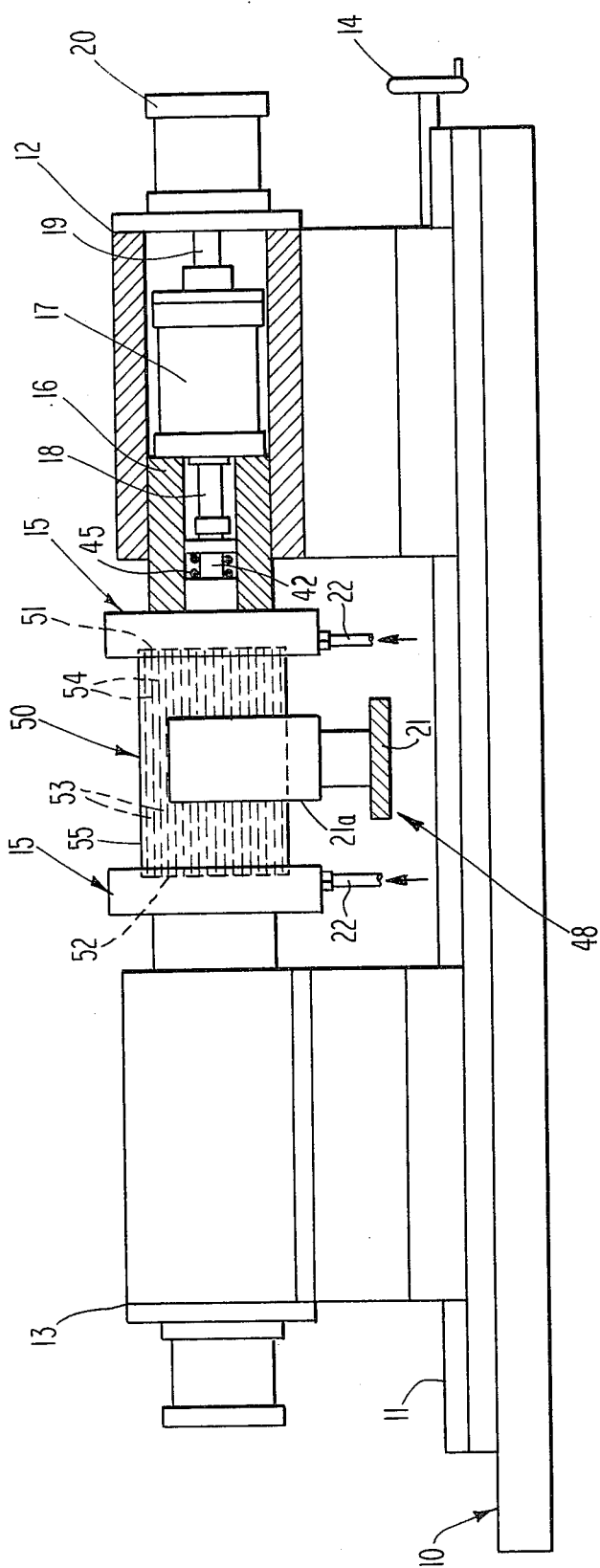
FIG. 1 depicts diagrammatically an envisioned preferred apparatus for fabricating filter bodies.
Figure 2:
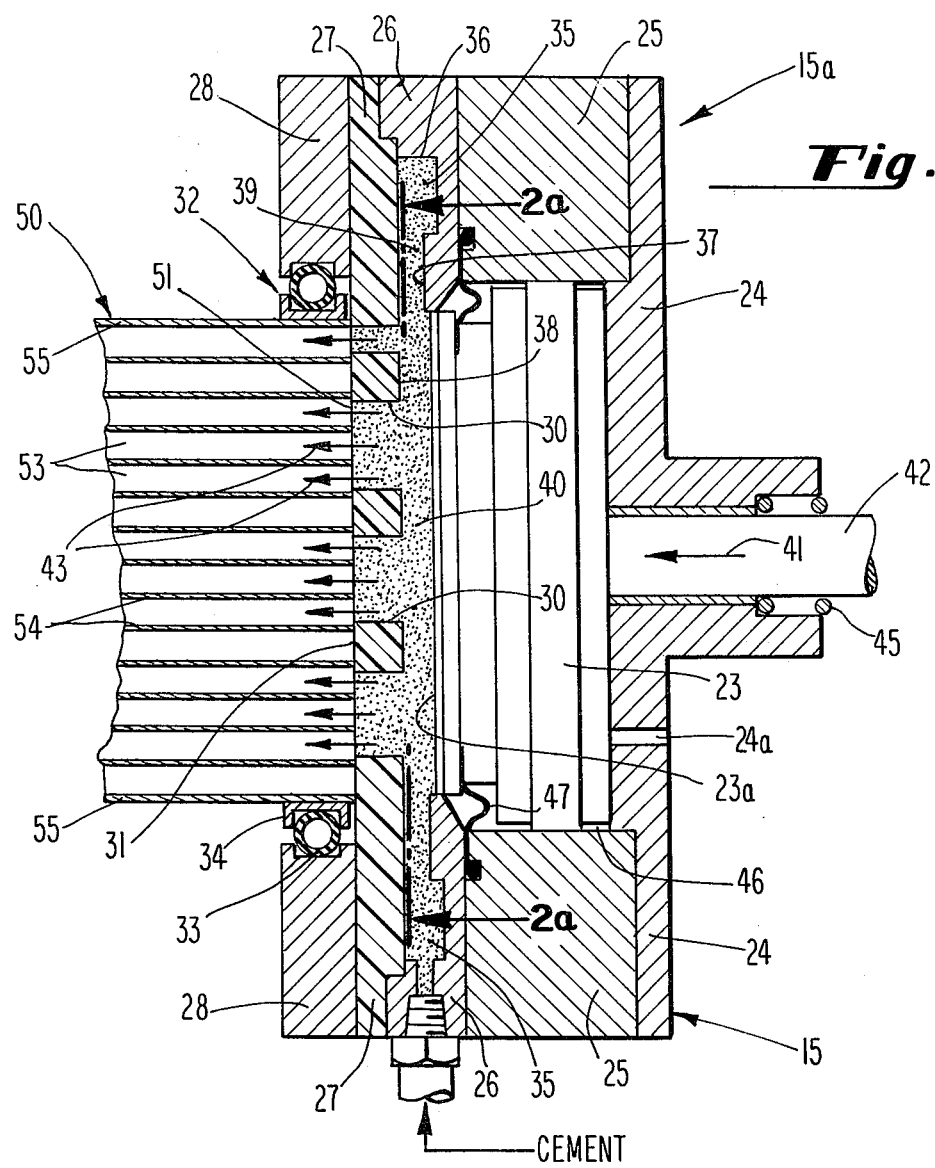
FIG. 2 depicts diagrammatically a partially sectioned feed head of the apparatus of FIG. 1.
Figure 4:
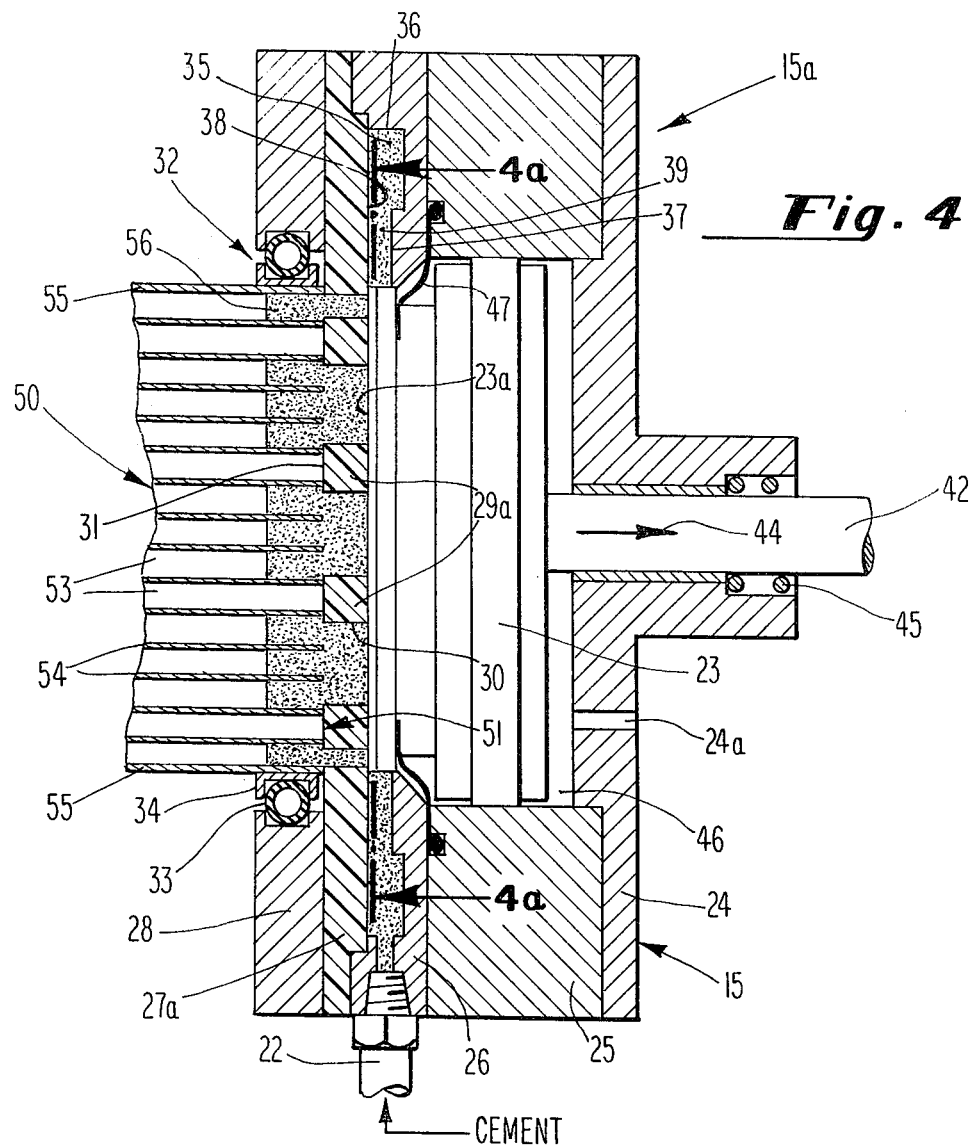
FIG. 4 is a partially sectioned diagrammatic view of the feed head of FIG. 1 with its piston in the advanced position and utilizing a different mask.

FIG. 1 depicts an envisioned preferred apparatus for practicing this invention. The apparatus includes a double-headed cement press 10 depicted in a partially sectioned profile view and comprises a frame 11 mounting horizontal opposing cement heads 12 and 13. The left cement head 13 is fixed to the frame 11. The right cement head 12 is adjustable in separation from the left cement head 13 by means of a screw 14 turning appropriate mechanical linkages such as a rack and pinion (not depicted) between the frame 11 and right cement head 12 to accommodate honeycomb structures 50 of various heights. The cement heads 12 and 13 are substantially identical in construction and the right head 12 has been sectioned to reveal its major components. A feed head 15, depicted in greater detail in FIGS. 2 and 4, is provided for pressing a ceramic cement or other plastically formable plugging material into ends of cells 53 (again see FIGS. 2 and 4) of the honeycomb structure 50. The feed head 15 is connected by suitable means such as a collar 16 to a first air cylinder 17 having an extendable plunger 18. The collar 16 is attached to the feed head 15 and cylinder 17 by suitable means such as bolts, other fasteners, welding, etc. The plunger 18 is advanced towards the feed head 15 by the operation of the cylinder 17 and advances a piston 23 within the feed head 15 by means of a connecting shaft 42 (see FIGS. 2 and 4). Advancement of the piston 23 charges plastically formable or flowable cement within the heads 15 into the open end faces 51 and 52 of the honeycomb structure 50. The feed heads 15 of the cement heads 12 and 13 are separated from one another for the insertion or the removal of honeycomb structures 50 by the operation of a second cylinder 20 which withdraws a second plunger 19 extending therefrom, the end of which is connected, again by suitble means such as welding, fasteners, etc., to the first air cylinder 17. Tubes 22 supply cement to the feed heads 15.

It is further envisioned that honeycomb structures 50 are carried to and from the press apparatus 10 by a conveyer 48 comprising a belt 21 (sectioned in FIG. 1) mounting a plurality of cradles 21a which are shaped so as to receive and support a honeycomb structure 50 by means of its outer sidewall 55 extending between the end faces 51 and 52. Control of movement of the belt 21 and suitable contouring of the cradle 21a and sidewall 55 allows each structure 50 to be located in a predetermined position with its end faces 51 and 52 precisely positioned opposite the feed heads 15 for plugging.

FIGS. 2 and 4 depict a partially sectioned envisioned feed head 15 with its piston 23 in retracted and advanced positions, respectively, and a sectioned portion of a honeycomb structure 50 having one end face 51 positioned against the head 15 for plugging. Honeycomb structures 50 are depicted in several of the figures and each has a first end face 51, a second opposing end face 52, a multiplicity of cells 53 extending in a substantially mutually parallel fashion through the structure 50 and a side wall surrounding the thin walls, the side wall 55 and cells 53 extending between the end faces 51 and 52. The cells 53 and end faces 51 and 52 are defined by a multiplicity of interconnected thin porous walls 54 (depicted in phantom in FIG. 1).

The feed head 15 comprises a piston 23 and a block 15a envisioned to be fabricated from several components including a backing plate 24, a cylinder plate 25, a feed chamber plate 26, a mask 27 and a cover plate 28. The various plates are held together by suitable means such as bolts passed through bores (neither depicted) extending through the various plates 24 through 28. The mask 27 is positioned opposite the piston 23, the face 23a of which forms (when the piston 23 is withdrawn) with the feed chamber plate 26, a feed chamber 40 through which cement is charged into the honeycomb structure 50. Openings 30 extend through the mask 27 from its inner "charging" surface 38 facing the feed chamber 40 and an opposite outer surface 31 against which the end face 51 of the structure 50 is positioned. The opposing filter end face 52 (see FIG. 1) is similarly positioned against a mask (not shown) in the feed head 15 of the remaining cement head 13, which is similar to mask 27. Flowable ceramic cement is injected under pressure into the head 15 through the tube 22 and feeds into a first hollow annular ring 35 formed between a cavity 36 of the feed chamber plate 25 and the mask "charging" surface 38. A second annular passage 39, formed between opposing surfaces 37 and 38 of the feed chamber plate 26 and mask 27, respectively, transports cement (indicated by shading) from the first annular ring 35 to the feed chamber 40. Advancement of the piston 23 in the direction of the arrow 41 to the position depicted in FIG. 4 by activation of the first air cylinder 17 charges cement in the feed chamber 40 (indicated by shading) into the ends of those cells 53 opposite the openings 30 where they appear through the mask surface 31, as is indicated by the arrows 43. The compressed air in the first air cylinder 17 is then released removing pressure on the plunger 18 and connecting shaft 42. The piston 23 is then retracted in the direction indicated by the arrow 44 (see FIG. 4) by means of a compression spring 45 around the connecting shaft 42.

Although the cradles 21a may be used for positioning the structure 50 for charging, a pneumatically inflatable collar 32 is also provided positioned around the working area of the outer mask surface 31 where the openings 30 are exposed. The collar 32 is retained in the head 15 by means of the cover plate 28. The collar 32 preferably comprises a flexible, inflatable tube 33 and a protective covering 34 around the inner periphery of the tube 33, such as a split ring metal collar, which is compressed around a portion of the side wall 55 of the structure 50 near the end face 51 by inflation of the tube 33. The collar 32 serves to prevent blowby of cement past the end face 51 onto the sidewall 55 of the structure 50 but may also be designed and operated to more precisely center and hold the end face 51 against the working area of the mask 27 (i.e. opposite the openings 30). The protective covering 34 provides means to better grip the sidewall 55 of the structure 50 and prevents frictional wear of the tube 33.

The piston 23 travels in a bore 46 formed by the cylinder plate 25 and feed chamber plate 26. A flexible annular gasket 47 is affixed near the head 23a of the piston 23 and between the bore plate 25 and feed chamber plate 26 to prevent blowby of the cement into the piston bore 46. The piston 23 may be formed from several joined segments, as depicted, for ease of construction and to allow insertion of the gasket 47. A bellofram diaphragm, which is formed from a butyl rubber impregnated nylon fabric, is suitable for use as the flexible gasket 47. A bore 24a has been provided through the backing plate 24 to allow air to enter and exit the cylinder bore 46 during movement of the piston 23.

Figure 2A:
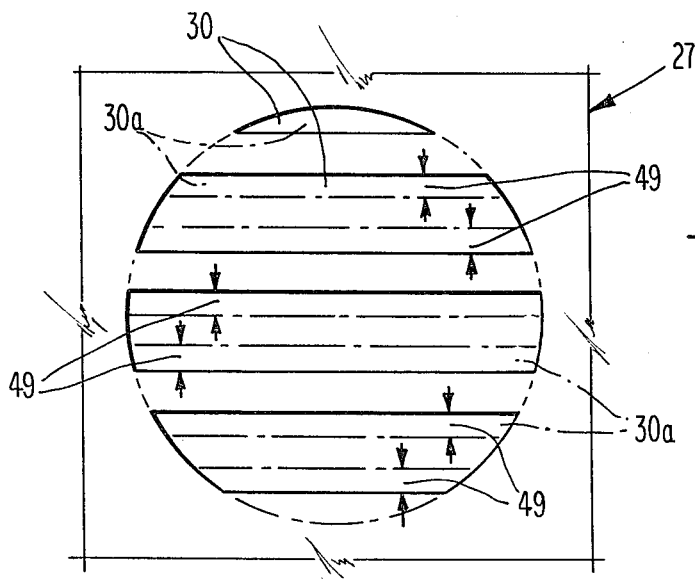
FIG. 2a is a view along the lines 2a—2a of FIG. 2 depicting diagrammatically the exposed surface of a mask used in the feed head of FIG. 2.

FIG. 2a is a diagrammatic view of the outer surface 31 of the mask 27 against which the structure end face 51 was positioned and depicts the openings 30 extending therethrough. Also indicated in phantom are openings 30a of a similar mask which is used against end face 52 in the remaining head 13 of the press 10. According to the invention, the mask 27 and the similar mask against end face 52 are fabricated and mounted in each feed head 15 so that an area of overlap 49 is formed between the edges of the openings 30 of the one mask 27 and the edges of the openings 30a of the remaining mask when the masks are aligned with respect to each other and viewed along an axis passing normally between their opposing outer surfaces 31. The mask 27 and the similar mask to press against end face 52 are fixedly mounted in the feed heads 15 of the opposing cement heads 12 and 13 which by their mounting to the frame 11 allows the heads 12 and 13 one degree of freedom thereby keeping these two masks in alignment.

Figure 3:
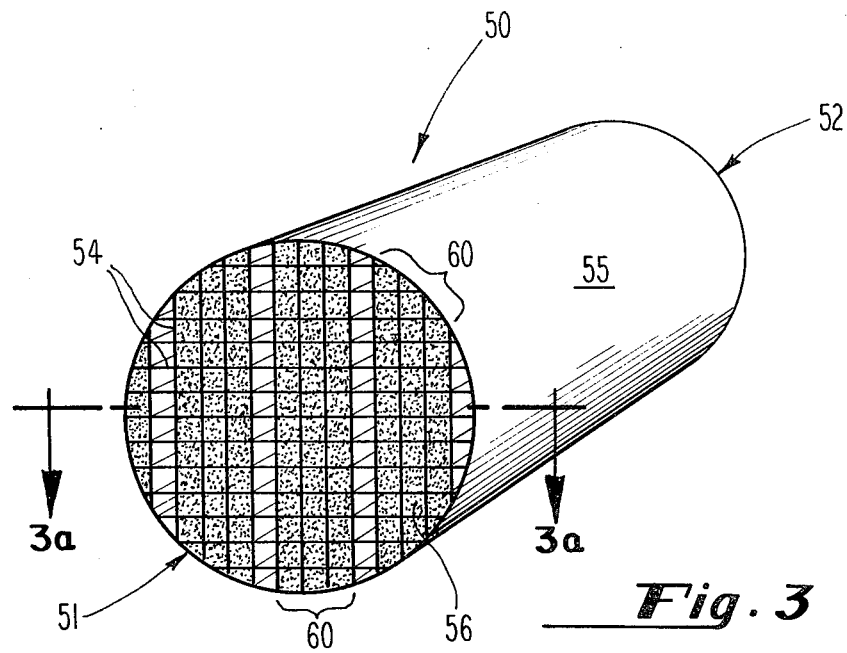
Figure 3A:
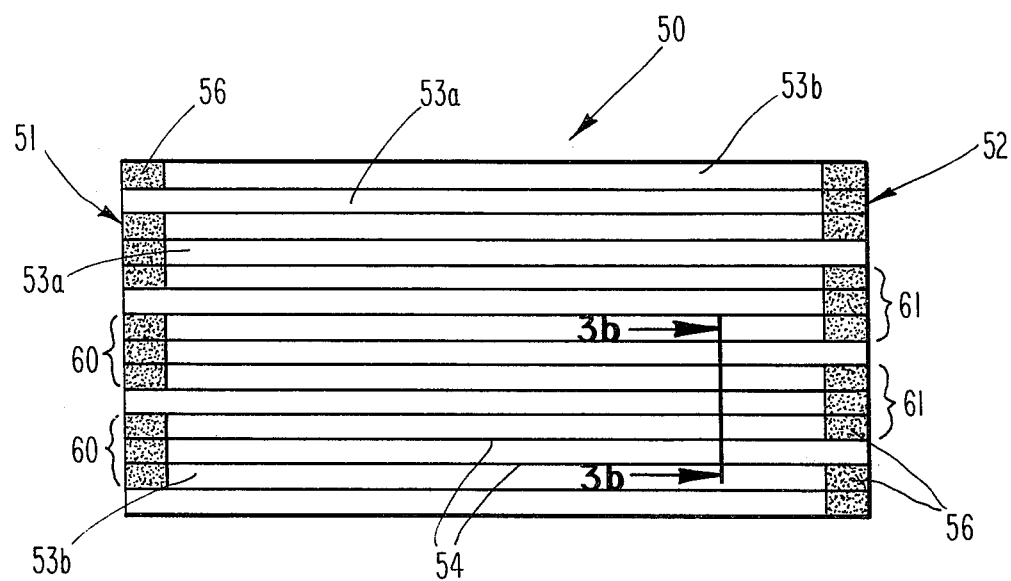
FIG. 3a is a diagrammatic view of the filter body of FIG. 3 sectioned along the lines 3a—3a depicting the overlapping plugging of stripes of mutually adjoining cell ends at either end face of the structure and the formation of stripes of mutually adjoining inlet cells and mutually adjoining outlet cells each sealed only at one of end faces separated by stripes of mutually adjoining buffer cells sealed at the two end faces.

FIG. 3 is an oblique view of a filter body envisioned to be formed from the structure 50 by the apparatus 10 and the aforesaid two masks, and it illustrates the substantially parallel stripes 60 of mutually adjoining cell ends closed at the end face 51 with plugs 56 formed using the mask 27. FIG. 3a is a longitudinally sectioned view of the filter of FIG. 3 along the lines 3a–3a and partially depicts the stripes 60 and similar stripes 61 of mutually adjoining cell ends closed at the remaining end face 52 by identical plugs 56 formed using the aforesaid similar mask. Those cells 53b which lie within the overlap 49 of the openings 30 and 30a would typically be filled at both their open ends (i.e., at both end faces 51 and 52 of the structure 50) while the remaining cells 53a (inlet and outlet cells) are plugged at only one of the two end faces 51 and 52.

Figure 3B:
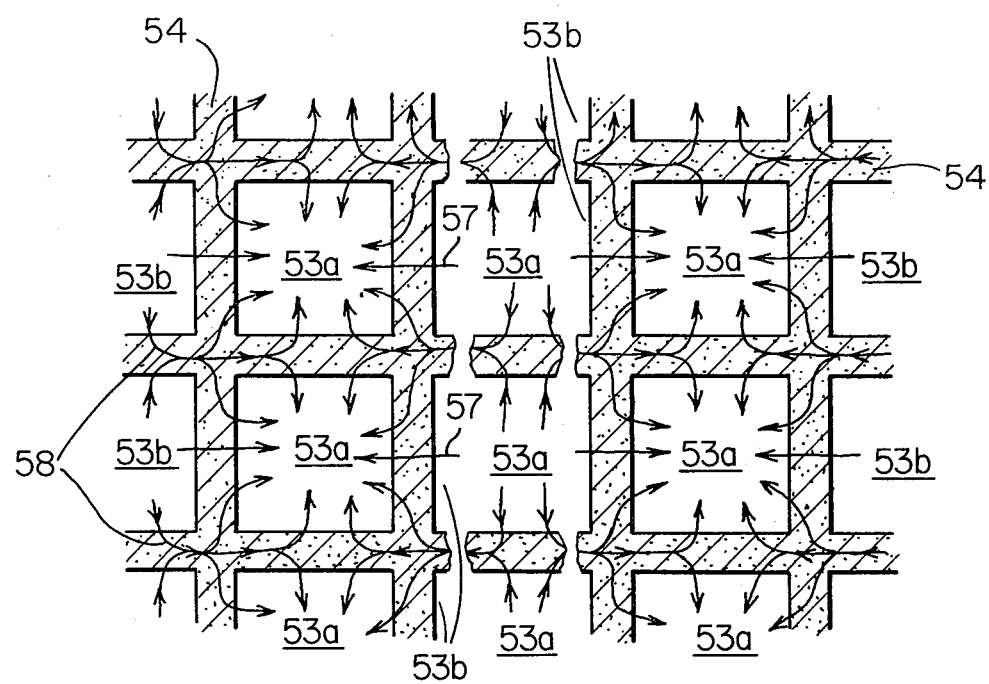
FIG. 3b is a greatly expanded, transversely sectioned, fractured view taken within the structure 50 of FIGS. 3 and 3a and along the line 3b—3b of FIG. 3a depicting fluid flow between and among the adjoining alternate columns of inlet, buffer and outlet cells.

FIG. 3 is a greatly expanded, fractured internal view of the structure 50 transverse to the central longitudinal axis of the cells 53a and 53b, and it depicts the fluid flow between alternating columns of the inlet and outlet cells 53a and the buffer cells 53b. The fluid flow across the narrow dimensions of the thin walls 54 between adjoining cells is indicated by arrows 57. Due to their interconnected open porosity (as further described hereinafter), the fluid flows through the longer dimensions of the thin walls 54 (i.e. between the outer planar surfaces of and within the thin walls 54 defining the inner surfaces of the cells 53a and 53b). Thus, fluid in the inlet cells 53a enters the horizontal thin walls 54 separating adjoining inlet cells 53a and travels laterally in either direction past buffer cells 53b to adjoining or neighboring (i.e. cells not sharing any thin wall in common) outlet cells 53a. The fluid may also flow through the remaining longer dimensions of the thin walls 54 (i.e. in the horizontal direction in FIG. 3a and normal to the plane of FIG. 3b) in migrating from the inlet cells 53a to the outlet cells 53a and/or to the outlet end face 52.

FIG. 4 depicts a feed head 15 identical to that in FIG. 2 with the exception that a different type of mask 27a has been provided and the piston 23 has been advanced with its head 23a in close proximity to the mask 27a showing the flow of the cement (indicated by shading) originally in the feed chamber 40 through the openings 30 in the mask 27a and into the ends of those cells 53 of the structure 50 opposite the openings 30 to form the plugs 56.

Figure 4A:
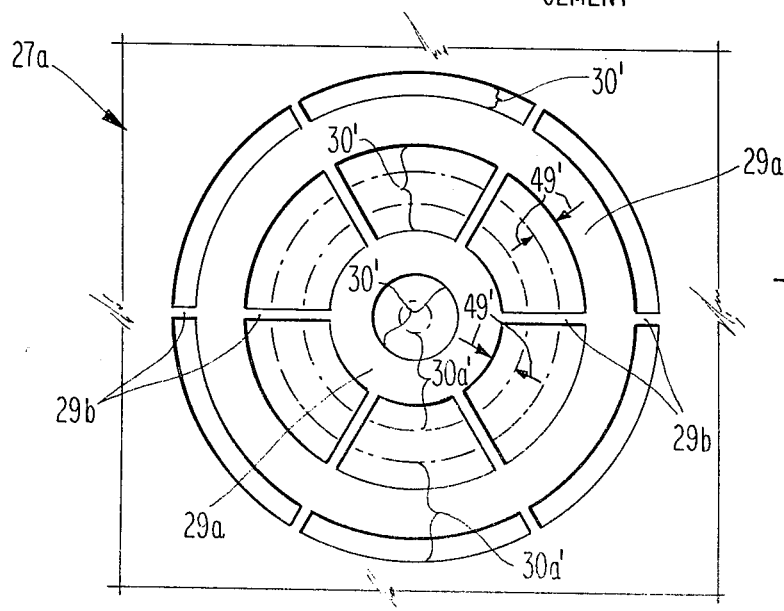
FIG. 4a is a view along the lines 4a—4a depicting diagrammatically one face of the mask used in the feed head of FIG. 4.

FIG. 4a is a diagrammatic view of a portion of the inner surface 38 of a second envisioned mask 27a. The mask 27a comprises a set of spaced, substantially concentric cover segments 29a which contact the end face 51 (or 52) of the structure 50 and cover a portion of a multiplicity of cells 53 exposed at that end face, and stringer segments 29b (also see FIG. 4) joining the cover segments 29a so as to form an integral mask 27a. Preferably the mask is formed from an elastomer in the manner described in the aforesaid application Ser. No. 283,734. Openings 30' extending through the mask 27a in a series of substantially concentric spaced rings, are formed within and between the cover segments 29a. It is envisioned that cement pressed through the mask 27a by the action of the piston 23 will flow around the stringer segments 29b and through the openings 30' wherever a stringer segment 29b spans such opening 30'. Again, openings 30a' at the outer surface 31 of a second mask (not shown but similar to mask 27a) which would be installed in the feed head 15 of the remaining cement head 13, are indicated in phantom. Again the mask 27a and the aforesaid similar second mask would be aligned with respect to one another so as to provide regions 49' where the openings 30' and 30a' overlap. The regions 49' define the zones where cells 53 of the structure 50 placed between the masks would typically be plugged at both end faces 51 and 52.

Figure 5:
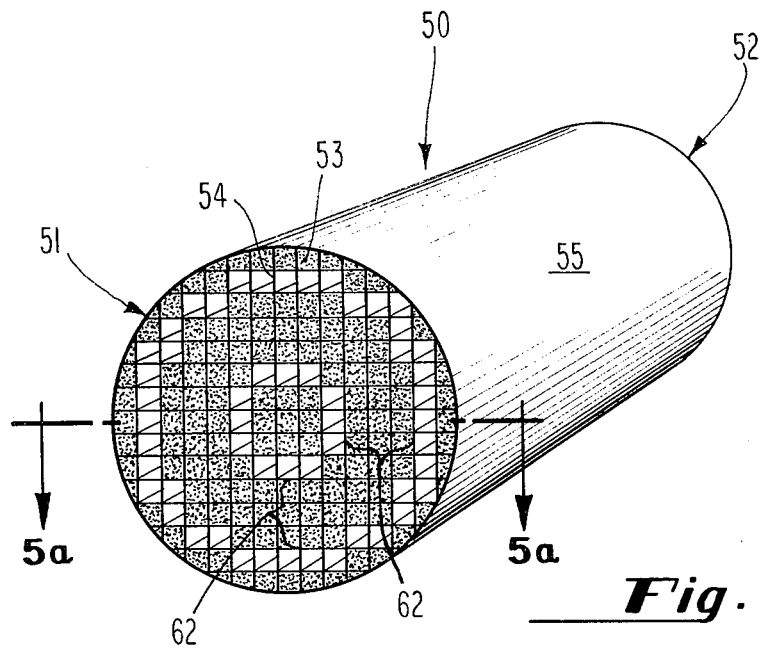
Figure 5A:
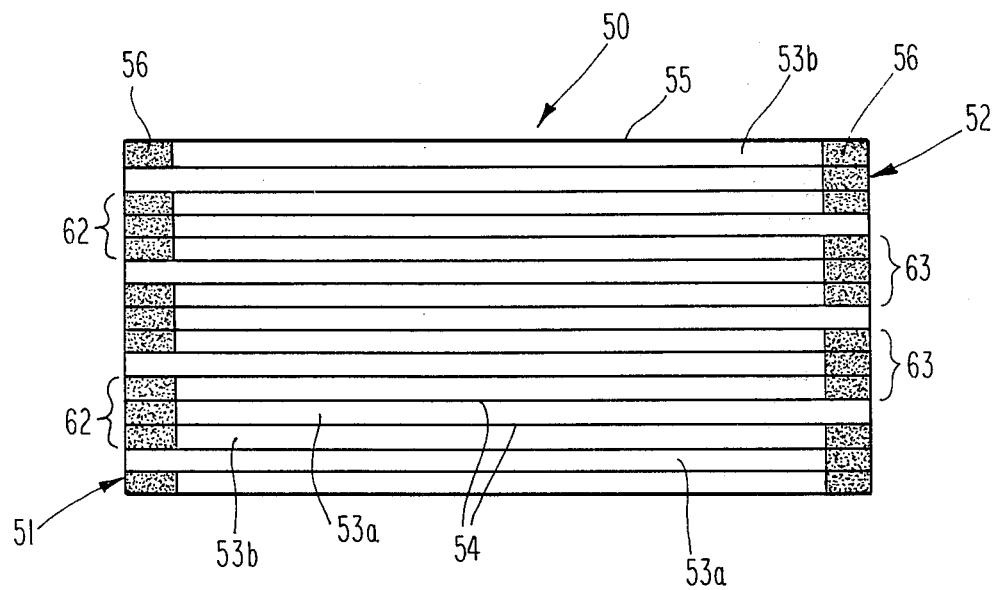
FIG. 5a is a diagrammatic view of the filter body of FIG. 5 sectioned along the lines 5a—5a depicting the overlapping plugging of concentric zones of mutually adjoining cell ends at either end face to form concentric zones of mutually adjoining inlet and mutually adjoining outlet cells, each plugged at only one end face, separated by concentric zones of mutually adjoining buffer cells, each plugged at the two end faces.

FIG. 5 is an oblique diagrammatic view of a filter body envisioned to be fabricated using the press apparatus 10 of FIG. 1 with the masks respectively similar to mask 27a of FIGS. 4 and 4a and the aforesaid second mask. As can be seen, clusters of mutually adjoining cell ends have been plugged at the end face 51 in the form of a series of spaced, substantially concentric zones 62. Similar spaced, substantially concentric zones 63 of mutually adjoining cell ends have been plugged at the opposing end face 52. The openings 30 and 30a through the mask 27a and the aforesaid second mask, respectively, have been sized and shaped and the masks aligned with respect to one another as indicated in FIG. 4a so that each of the zones 62 of closed cell ends at the one end face 51 adjoins or partially overlaps zones 63 of closed cell ends at the remaining end face 52. This can be better seen in FIG. 5a, which is a longitudinally sectioned view of the structure 50 of FIG. 5 cutting across the series of concentric zones 62 and 63 at each end face 51 and 52, and revealing the plugs 56 formed in those cells 53a sealed at only one end face (inlet and outlet cells) and in those cells 53b lying in the regions of overlap 49' of the aforesaid two masks and sealed at the two end faces 51 and 52 (buffer cells). Either end face 51 or 52 of the honeycomb structures 50 may be used as the inlet or outlet end face of the filter. Those cells 53a sealed at only the outlet face become the inlet cells and those cells 53a sealed only at the inlet face become the outlet cells of the filter. Subsets of inlet and outlet cells are alternated with one another and separated by subsets of buffer cells 53b, plugged at both end faces 51 and 52, which lie between the adjoin the alternate inlet and outlet cell subsets. This description similarly applies to the filter body depicted in FIGS. 3 and 3a formed by the masks 27 and 27a.

It should be appreciated that the apparent size of the thin walls 54 and the cells 53 formed by those walls in FIGS. 1, 2, 3, 3a, 4, 5 and 5a, as well as the size of the openings 30 and 30' and indicated openings 30a and 30a' of the masks are considerably greater than would often be encountered for many filter body fabricating applications in order to achieve sufficient clarity in the drawings. Moreover all relative sizes including those of the press 10, feed heads 15 and honeycomb structure 50 will typically vary from that indicated in the drawings.

The honeycomb structures 50 may be made of any suitable material that provides their thin walls 54 with internal interconnected open porosity sufficient to allow fluid to flow at least across their narrow dimension and, preferably, through their longer dimensions between adjoining or nearby cells and to restrain at least a significant portion or substantially all, as desired, of the solid particulates contaminating the fluid from passing entirely across or through the thin walls in any direction. These materials may include powdered metals, glasses, ceramic (generally crystalline), resins or organic polymers, papers or textile fabrics (with or without fillers), and combinations thereof including, for example, glass-ceramic mixtures and cermets. It is preferred to fabricate the thin walls 54 from plastically formable and sinterable finely divided particulates and- /or short length fibers of substances that yield a porous sintered material after being fired to affect the sintering thereof, especially ceramics, glass-ceramics, cermets or other ceramic-based mixtures, powdered metals and glasses. In addition to volatizable plasticizers and/or binders, which may be used to prepare workable batch mixtures, any suitable or conventional fugitive or combustible (burn-out) additive can be dispersed within the formable and sinterable mixture so as to provide appropriate and adequate interconnected open porosity in the sintered material of the thin walls 54. The requisite open porosity can be designed into the thin walls 54 by raw material selection as is described in U.S. Pat. No. 3,950,175 incorporated by reference. Although the thin walls 54 may be fabricated by any suitable technique for the materials selected, they are preferably formed monolithically with a side wall 55 by extrusion from a sinterable mixture in the manner disclosed in U.S. Pat. Nos. 3,790,654, 3,919,384 and 4,008,033 and in a pending application Ser. No. 260,343 filed May 4, 1981, now U.S. Pat. No. 4,364,888, assigned to the assignee hereof, and all incorporated by reference herein.

The cell ends may be closed with any material and in any manner compatible with the material of the thin walls 54 under the envisioned service conditions of the filter. This includes non-deleterious reaction with the thin wall material and contaminated fluid, either singularly or in common, good adhesion to the thin walls 54, suitable durability to the fluid flows at the desired flow rates, similar coefficients of thermal expansion (if the filter is to be used at elevated temperatures), etc. Preferably after being formed by charging, the plugs 56 are cured, dried, fired, or otherwise processed to transform the flowable/formable material into a solid closure which adheres mechanically and/or chemically to the cell walls 54 and covers or fills the cell end preventing the undesired passage of contaminant. The plugs 56 may be either porous or non-porous, although in the former case the open porosity and/or mean pore size should not be so great as to allow the passage of solid particulate contaminant through or around the plugs 56 and hence, through the structure 50.

One envisioned use of the described filters is to remove carbonaceous material from diesel engine exhaust. Application Ser. No. 165,646 identifies several ceramic batch mixture compositions for fabricating cordierite solid particulate filter bodies having thin walls of various open porosities and mean pore sizes which are useful for diesel exhaust filtration. It is further envisioned that the plugs 56 will be formed from a foam-type cordierite ceramic cement such as is also described in the application Ser. No. 165,646, and which is more generally described and claimed in a pending application Ser. No. 165,647, filed July 3, 1980, now U.S. Pat. No. 4,297,140, which is incorporated by reference. Other cordierite ceramic structure and nonfoaming plugging cement combinations are described in yet another pending application Ser. No. 295,612 filed Aug. 8, 1981, assigned to the assignee of this application and incorporated by reference. Methods of mounting such filters to obtain filtration through the side wall 55 as well as through the thin walls 54 are described in yet another pending application Ser. No. 351,126, filed Feb. 22, 1982, assigned to the assignee hereof and incorporated by reference herein. A thin wall 54 provided within internal interconnected open porosity having a open pore volume of at least 25%, desirably at least about 35% and, for diesel particulate filtration, preferably between about 40 and 70% of the thin wall bulk volume to minimize hydraulic resistance to fluid flow and foster fluid flow through the longer as well as across the narrower dimensions of thin walls. The open porosity of the thin walls is further formed by pores having mean diameters of between about 1 and 60 micrometers (i.e. microns) and preferably between about 10 and 50 microns. The thin walls 54 are desirably less than about 0.60 in. (about 1.5 mm.) to minimize filter volume and, preferably, between about 0.010 and 0.030 in. (about 0.25 and 0.76 mm.) to optimize minimum pressure drop and maximum filter strength at the indicated open porosity. Transverse cross sectional cellular densities between about 10 and 300 cells/in.$^2$ (about 1.5 and 46.5 cells/cm.$^2$) are envisioned to be useful and between about 100 and 200 cells/in.$^2$ (about 15.5 and 31 cells/cm.$^2$ are preferred. Filter efficiencies ranging from less than about 50% to 90% or more may be usefully employed depending upon the operating characteristics of the diesel engine involved and its planned usage. Open porosity of the thin walls is determined by conventional mercury intrusion porosimetry techniques.

The width of the overlap 49 used will depend upon several factors including the transverse cross-sectional geometries of the structure cells, the magnitude of the greatest lateral displacement of the ends of the cells at the two opposing end faces which can be expected or is allowed in fabricating the structure and the nature of the plugging material used. It is believed that approximately 50% or more of the square transverse cross-sectional area of the depicted square cells or of other cells having areas of reasonably uniform diameter such as circular, near circular, equilateral and nearly equilateral polygonic cross-sectional shapes, must communicate with a mask opening 30, 30', 30a or 30a' to assure plugging of the cell using the above-referenced foam-type cordierite plugging cement. It is further envisioned that a one cell pitch (one cell pitch equals the length of a row of adjoining cells divided by the number of cells in the row) overlap 49 is sufficient to account for the lateral displacement of the cell ends which can be expected from then cordierite honeycomb structures fabricated in the manner described in the application Ser. No. 165,646 and to assure that all cells of such structures are sealed at at least one end face. It will be appreciated by one in the art that plugging patterns produced by these methods and apparatus will vary from structure to structure depending upon the position of the structure and to angular orientation of the cells with respect to the mask openings 30 and 30a, as well as upon cellular distortions at the end faces and lateral displacements of individual cells between the end faces of the structure. It will further be appreciated that the clusters of inlet, outlet and buffer cells may vary in width as greater or lesser numbers of cells lie by happenstance within the regions of overlap 49 between the openings 30 and 30a. Thus precisely parallel stripes or concentric rings of uniform widths will not be formed and furthermore, in some instances, almost no buffer cells may be formed. The method and apparatus are insensitive to the arrangement of cells at the end faces.

In addition to the envisioned preferred embodiment in the invention depicted in FIG. 1, alternate embodiments of the invention are envisioned as being useful. For example, the press apparatus 10 of FIG. 1 may be rotated so the cement heads 12 and 13 oppose one another in a vertical orientation and a mechanical jaw substituted for the coveyor 48 and cradles 21a for transporting honeycomb structures to and from and centering them with respect to the feed heads 15, as for example, is depicted in the application Ser. No. 283,732.

Figure 6:
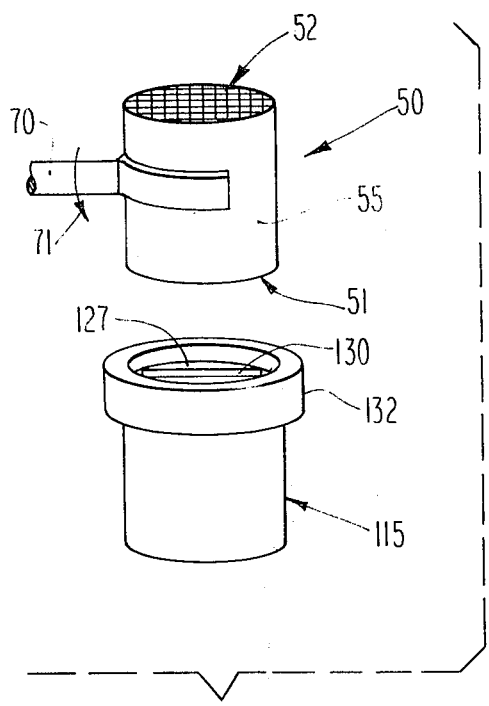
FIG. 6 is a diagrammatic view of an envisioned single mask/feed head apparatus for plugging opposing end faces of a honeycomb structure sequentially.

Another envisioned embodiment is depicted very schematically in FIG. 6. A single feed head 115 with mask 127, similar to that in FIGS. 2 and 4, is used to charge both end faces 51 and 52 of a typical honeycomb structure 50. A mechanical jaw 70 or other comparable device holds and initially positions one end face 51 of the structure 50 against the mask 127 in the feed head 115 for charging. The jaw 70 may be constructed to position the end face 51 or 52 of the structure 50 against the feed head 115 or the feed head 115 may be advanced towards the end face of the structure 50 by equipment like that in the cement heads 12 and 13 of the press 10 of FIG. 1. The feed head 115 may again be fitted with a collar 132 to assist in centering and gripping the structure 50 against the feed head 115 during the charging operation. After the first end face 51 has been plugged, the structure 50 and feed head 115 are separated and the structure 50 rotated 180° by the jaw 70 as, is indicated by the arrow 71, and the end face 52 presented to the feed head 115 and charged in a similar manner.

The mask used in the feed head 115 of FIG. 6 must, of course, be constructed to assure that overlapping coverage be provided at the two end faces 51 and 52 of the structure by openings 130 through the mask 127.

Figure 7:
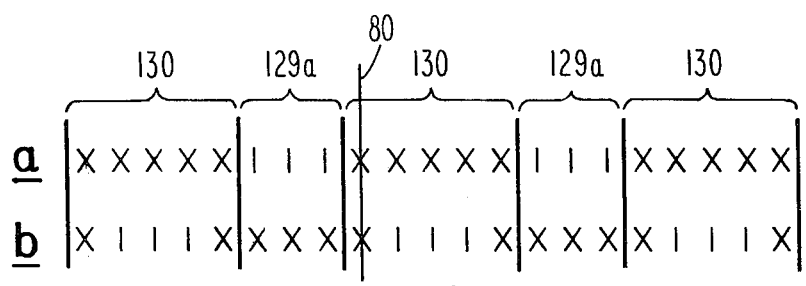
FIG. 7 depicts diagrammatically a portion of the cell plugging patterns achieved on the opposing end faces of a typical honeycomb structure utilizing one mask embodiment in the apparatus of FIG. 6.
Figure 8:
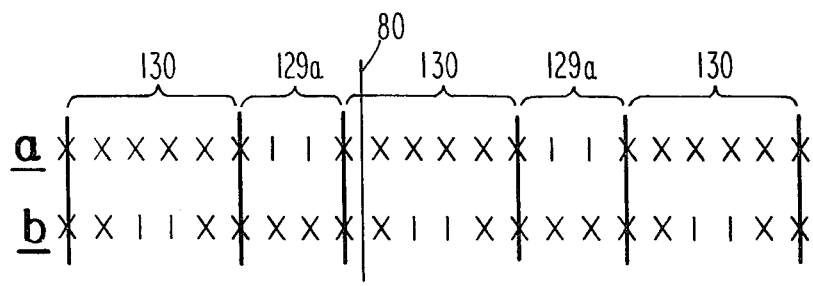
FIG. 8 depicts diagrammatically a portion of the cell plugging patterns achieved on opposing end faces of a honeycomb structure using an alternative mask embodiment in the apparatus of FIG. 6.

FIGS. 7 and 8 depicts diagrammatically the openings 130 and cover segments 129a therebetween located at the center of the working area of an exemplary envisioned mask 127 for use with the feed head 115. The mask 127 forms stripes of mutually adjoining closed cell ends at either end face 51 and 52 of a structure 50. The line 80 is the diameter of the end faces 51 and 52 parallel to the sides of the openings 130 and cover segment 129a when either is fitted against the feed head 115 for charging. The width of each of the openings 130 is approximately four cell pitches and is one cell pitch greater than that of the cover segments 129b. Line a of FIG. 7 indicates by "X's" the cells which would be plugged at a first end face of the structure having a cell lying along the diameter 80 of the end face. The location of cell ends which would not be plugged at that end face are represented by "|'s". Line b of FIG. 7 indicates again with "X's" and "|'s" the locations of the closed and open cells at the first end face 51 of the structure 50 after it has been rotated in the manner indicated in FIG. 6 and the second end face 52 presented to the feed head 115. When the second end face 52 is precisely positioned laterally with respect to the mask, double overlapping cell closure is achieved as is indicated by the vertical overlapping of "X's" in the lines a and b. Line a of FIG. 8 depicts again with "X's" the locations of cell ends which are plugged at a first end face 51 of a structure where the diameter 80 of the end face 51 lies between two cells. Again the cell ends which would remain unplugged are indicated by "|'s". Line b of FIG. 8 indicates the locations of the plugged and open cell ends at the end face 51 when the structure 50 is rotated 180° in the manner indicated in FIG. 6 to present the end face 52 to the mask of that apparatus. The arrangement depicted in FIG. 7 result in stripes of inlet and outlet cells, typically 3 cells wide, being formed and separated by stripes of buffer cells typically one cell wide while the arrangement depicted in FIG. 8 result in stripes of inlet cells and outlet cells typically two cells wide being separated by stripes of buffer cells also typically two cells wide. As sequential identical lateral centering of the two end faces 51 and 52 of a structure 50 is crucial to its successful practice, this method, is envisioned to be less useful with higher cellular density honeycomb structures having more restricted centering tolerances. As with the embodiment of FIGS. 2–2a, it is envisioned that striped zones of plugged cell ends will be formed at the end faces 51 and 52 of the honeycomb structure 50 regardless of the angular orientation of the end faces 51 and 52 and thus, of the sidewalls 54 forming the cells 53, with respect to the edges between the openings 130 and cover segments 129a of the mask of 127. The same angular insensitivity similarly applies to the masks of FIGS. 4–4a.

Figure 9:
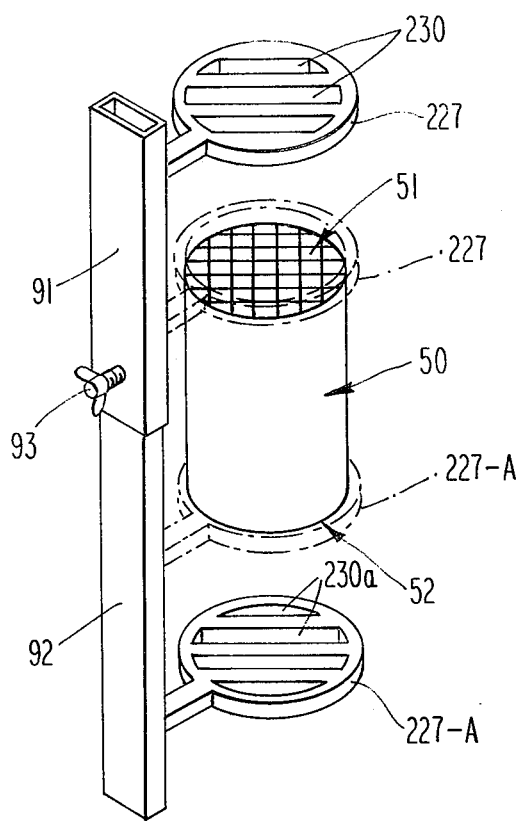
FIG. 9 is a diagrammatic view of yet another envisioned apparatus embodiment for positioning a pair of masks in alignment with respect to one another against opposite end faces of a honeycomb structure for charging cells of the structure.

It is further envisioned that instead of fixing a mask or masks in a feed head or heads of a press apparatus, that a pair of masks having overlapping openings may be positioned against opposing end faces of a honeycomb structure and held in place in alignment with respect to one another by a suitable frame mounting the masks. Plugging material may be pressed through the masks in any suitable manner. FIG. 9 depicts one embodiment of such an apparatus and comprises masks 227 and 227-A having respective openings 230 and 230a which overlap at their edges when the masks are aligned opposite one another, as indicated. The masks 227 and 227-A are respectively affixed to rods 91 and 92 which telescope with respect to one another. The rods 91 and 92 can be extended (as is indicated) or collapsed (as is indicated in phantom) so as to position the masks 227 and 227-A against and remove them from opposing ends faces 51 and 52 of a honeycomb structure 50. It is envisioned that rods 91 and 92 have eccentric cross-sections or other means so as to restrict to a single degree of freedom of movement and thus prevent them from rotating so as to keep the openings 230 and 230a of the masks 227 and 227-A in overlapping alignment. It is further envisioned that the rods 91 and 92 may be locked in any desired position by means of a lock screw 93 or any of a wide variety of releasable locking mechanisms known in machine design art. The apparatus of FIG. 9 is also quite exemplary, there being a wide range of possible frames and mounting arrangements which can be used to keep a pair of masks 227, 227-A releasably fixed in alignment with respect to one another on opposing end faces of a honeycomb structure 50.

It is further envisioned that other plugging patterns including non-symmetric patterns can be achieved using a pair of masks as depicted in FIGS. 1 through 2a, 4 through 4a and 9 to form filters having greater collective inlet than collective outlet cell surface areas, in the manner described and claimed in the aforesaid pending application Ser. No. 350,995.

While particular embodiments of the various aspects of the present invention have been shown and described and some modifications to those embodiments suggested, it will be appreciated that other modifications of the invention not specifically mentioned will occur to those skilled in the art and are intended to be included within the scope of the invention set forth in the appended claims.

What is claimed:

1. A honeycomb filter body for removing solid particulates from fluids passed through the body comprising:
   a matrix of thin, interconnected walls defining an inlet end face and an outlet end face on opposing outer surfaces of the body and a multiplicity of cells extending through the body between the inlet and outlet end faces in a substantially longitudinal and mutual parallel fashion, the thin walls having interconnected open porosity of a volume and size sufficient to enable the fluid to flow at least across the narrow dimensions of the thin walls and to prevent at least a significant portion of the solid particulates in the fluid from passing either completely across or through the thin walls;

a first set of cells, each being open at one end face and closed at the remaining end face;

a second set of cells, each being open at said remaining end face and closed at said one end face;

each of the first and second sets of cells being further divided into a plurality of subsets of mutually adjoining cells of each respective set of the cells; and at least one subset of mutually adjoining buffer cells, each buffer cell being closed at the two end faces, the at least one subset of buffer cells being positioned between and adjoining a subset of the first set of cells and a subset of the second set of cells.

2. The filter body of claim 1 wherein said subsets of mutually adjoining cells are arranged to form a series of substantially concentric zones at the end faces of the body.

3. The filter body of claim 1 wherein the subsets of mutually adjoining cells are arranged to form a series of substantially parallel stripes across the end faces.

4. The filter body of claim 1 wherein the interconnected open porosity of the thin walls is also of a volume and size sufficient to enable the fluid passed into the filter body to flow through the longer dimensions of the thin walls.

5. The filter body of claim 4 wherein the interconnected open porosity is at least 25% of the bulk volume of the thin walls and is formed by pores having mean diameters between 1 and 60 microns.

6. The filter body of claim 5 wherein the thin walls are of a substantially uniform thickness less than about 1.5 mm.

7. The filter body of claim 6 wherein said substantial uniform thickness is between about 0.25 and 0.76 mm., said open porosity is between 35 and 70% of the bulk volume of the thin walls and is formed by pores having mean diameters between about 10 and 50 microns.

8. The filter body of claim 1, 4 or 7 formed from a sintered ceramic material.

* * * * *